United States Patent Office 3,763,288
Patented Oct. 2, 1973

3,763,288
O-LOWER ALKYL-O-SUBSTITUTED PHENYL-S-ALKOXYETHYLPHOSPHOROTHIOLATES
Shigeo Kishino, Tokyo, Akio Kudamatsu, Kawasaki, Yoshio Kurahashi, Tokyo, and Kozo Shiokawa, Kawasaki, Japan, assignors to Bayer Aktiengesellschaft, Leverkusen, Germany
No Drawing. Filed Jan. 28, 1971, Ser. No. 110,630
Claims priority, application Japan, Feb. 3, 1970, 45/8,995
Int. Cl. C07f 9/18; A01n 9/36
U.S. Cl. 260—949      14 Claims

ABSTRACT OF THE DISCLOSURE

O-lower alkyl-O-substituted phenyl S-alkoxyethylphosphorothiolates, i.e. O-methyl or -ethyl-O-substituted phenyl-S-lower alkoxy-ethylphosphorothiolates, which possess insecticidal, acaricidal, nematocidal and fungicidal properties.

---

The present invention relates to and has for its objects the provision of particular new O-lower alkyl-O-substituted phenyl S - alkoxyethylphosphorothiolates, i.e. O-methyl or ethyl-O-substituted phenyl-S-lower alkoxy-ethylphosphorothiolates, which possess insecticidal, acaricidal, nematocidal and fungicidal properties, active compositions in the form of mixtures of such compounds with solid and liquid dispersible carrier vehicles, and methods for producing such compounds and for using such compound in a new way especially for combating harmful insects and plant parasites and microorganisms with other and further objects becoming apparent from a study of the within specification and accompanying examples.

From the specification of Netherlands Pat. No. 68/6,844 it is known that the compound of the following formula

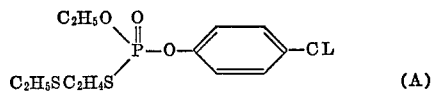

(A)

has insecticidal and fungicidal activity.

It has now surprisingly been found that organic phosphoric acid esters of the following general formula:

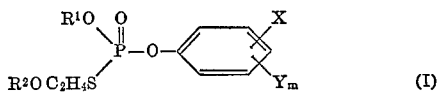

(I)

wherein
$R^1$ is a methyl or ethyl group,
$R^2$ is a lower alkyl group,
X is a lower alkoxy, lower alkylmercapto, lower alkylsulphinyl, lower alkoxycarbonyl, nitro or phenyl group,
Y is a halogen atom or a lower alkyl group, and
$m$ is 0, 1 or 2, exhibit excellent insecticidal, acaricidal, nematocidal, bactericidal and fungicidal activity, the range of activity and its magnitude being much more so than with the Compound A noted hereinabove. The novel compounds thus represent an unobvious advance in the art.

The invention also provides processes for the production of a compound of Formula I in which (a) a compound of the formula

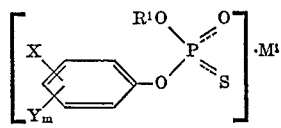

(II)

is reacted with a compound of the formula $$\text{Hal—CH}_2\text{CH}_2\text{—O—R}^2 \quad \text{(III)}$$

or (b) a compound of the formula

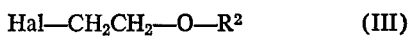

(IV)

is reacted with a compound of the formula

(V)

in which $R^1$, $R^2$, X, Y and $m$ are the same as defined above,
$M^1$ is a metal or ammonium group,
$M^2$ is hydrogen, a metal or ammonium group, and
Hal is halogen.

The organic phosphoric acid esters of this invention have excellent insect-killing properties and are utilized for controlling various harmful insects such as sucking insects, biting insects and harmful plant parasites. More specifically, they are effective as insecticides against insects harmful to agriculture such as insects of the orders Coleoptera, Lepidoptera, Aphiade, Orthoptera, Isoptera and Acarina, spider mites and harmful nematodes living in soil. Thus, they can be used as agents for protecting plants from these insects, acarids, nematodes, and the like.

The compounds of this invention are characterized in that they also exhibit excellent residual effects when used against hygiene pests and pests harmful to stored grain such as flies, cockroaches, mosquitoes and gnats.

The organic phosphoric acid esters of this invention, furthermore, exhibit fungicidal activity and growth-preventive activity against fungi and bacteria which infect plants and can be used for controlling diseases caused by various fungi of a broad range, especially for controlling rice plant diseases.

As fungicides they can be used effectively against diseases of plants caused by Archimycetes, Phycomycetes, Ascomycetes, Basidiomycetes, *Fungi imperfecti* and other fungi. Particularly, they are effective against organisms causing diseases in rice plants, fruit trees and vegetables, more particularly, against that in rice plants.

The compounds of this invention have excellent biological activities over a broad range.

Further, since they are free of any harmful heavy metal, they do not cause any problem of heavy metal poisons remaining in crops. Furthermore, they do not exhibit a violent acute toxicity which is found in the case of parathion or the like, but rather have low toxicity. Accordingly, they are used advantageously as agricultural chemicals.

Process variant (a), referred to hereinabove, is illustrated by the following reaction scheme:

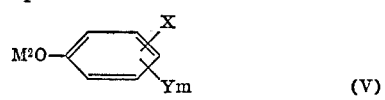

(II)

$$\text{Hal—CH}_2\text{CH}_2\text{—O—R}^2 \longrightarrow$$
(III)

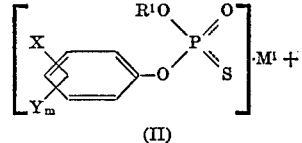

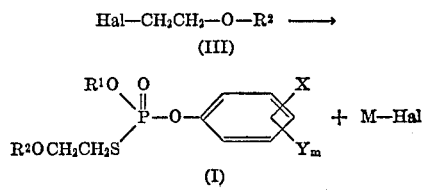

Examples of O-alkyl-O-substituted - phenylthiophosphates of General Formula II are as follows:

Potassium salts of O-methyl-O-(4-methoxy)phenylthiophosphate,
O-ethyl-O-(4-methoxy)phenylthiophosphate,
O-ethyl-O-(2-methoxy)phenylthiophosphate,
O-ethyl-O-(2-methyl-4-methylmercapto)phenylthiophosphate,
O-methyl-O-(4-methylmercapto)phenylthiophosphate,
O-ethyl-O-(4-methylmercapto)phenylthiophosphate,
O-methyl-O-(3-methyl-4-methylmercapto)phenylthiophosphate,
O-ethyl-O-(3-methyl-4-methylmercapto)phenylthiophosphate,
O-ethyl-O-(3,5-dimethyl-4-methylmercapto)phenylthiophosphate,
O-methyl-O-(2-chloro-4-methylmercapto)phenylthiophosphate,
O-ethyl-O-(2-chloro-4-methylmercapto)phenylthiophosphate,
O-ethyl-O-(4-methylsulphinyl)phenylthiophosphate,
O-ethyl-O-(2-methyl-4-methylsulphinyl)phenylthiophosphate,
O-ethyl-O-(3-methyl-4-methylsulphinyl)phenylthiophosphate,
O-ethyl-O-(4-methoxycarbonyl)phenylthiophosphate,
O-ethyl-O-(2-ethoxycarbonyl)phenylthiophosphate,
O-methyl-O-(4-ethoxycarbonyl)phenylthiophosphate,
O-ethyl-O-(4-ethoxycarbonyl)phenylthiophosphate,
O-ethyl-O-(2-phenyl)phenylthiophosphate,
O-methyl-O-(4-phenyl)phenylthiophosphate,
O-ethyl-O-(4-phenyl)phenylthiophosphate,
O-methyl-O-(2-nitro)phenylthiophosphate,
O-ethyl-O-(2-nitro)phenylthiophosphate,
O-methyl-O-(4-nitro)phenylthiophosphate,
O-ethyl-O-(4-nitro)phenylthiophosphate,
O-ethyl-O-(2-nitro-4-methyl)phenylthiophosphate,
O-methyl-O-(2-chloro-4-nitro)phenylthiophosphate,
O-ethyl-O-(2-chloro-4-nitro)phenylthiophosphate,
O-methyl-O-(3-methyl-4-nitro)phenylthiophosphate and
O-ethyl-O-(3-methyl-4-nitro)phenylthiophosphate, and the like. Sodium or ammonium phenylthiophosphates corresponding to the above cited potassium salts may be also used.

As 2-alkoxy ethyl halides of General Formula III there may be cited:

2-methoxyethyl bromide,
2-ethoxyethyl bromide,
2-n-(or iso-)propoxyethyl bromide,
2-n-(iso-, sec.- or tert.-) butoxyethyl bromide, and the like. Instead of the above cited 2-alkoxyethyl bromides there may be used corresponding 2-alkoxyethyl chlorides or 2-alkoxyethyl iodides.

It is preferable that process variant (a) is conducted in the presence of a solvent which term includes a mere diluent.

As the solvent there may preferably be used aliphatic or aromatic hydrocarbons which may be halogenated, such as benzine, methylene chloride, chloroform, carbon tetrachloride, benzene, chlorobenzene, toluene and xylene; ethers such as diethyl ether, dibutyl ether, dioxane and tetrahydrofurane; and low boiling alcohols and ketones such as methanol, ethanol, isopropanol, acetone, methylethylketone, methylisopropylketone and methylsiobutylketone. Lower aliphatic nitriles such as acetonitrile and propionitrile may be also used.

Process variant (a) may be carried out at temperatures over a broad range. Generally, the reaction is conducted at temperatures ranging from about −20° C. to the boiling point of the reaction mixture, preferably about 0–100° C.

The reaction is preferably performed under atmospheric pressure, but it is possible to conduct the reaction under reduced or elevated pressure.

The starting O-alkyl-O-substituted-phenylthiophosphates of Formula II may be prepared by customary known methods, for instance by reacting an O-alkyl-O-substituted-phenylthionophosphoryl chloride with an alkali hydroxide. The resulting salt of O-alkyl-O-substituted-phenylthiophosphate may be used after isolation or may be subsequently reacted with a 2-alkoxyethyl halide without isolation, to form the intended product of the General Formula I.

Process variant (b) is illustrated by the following formula scheme:

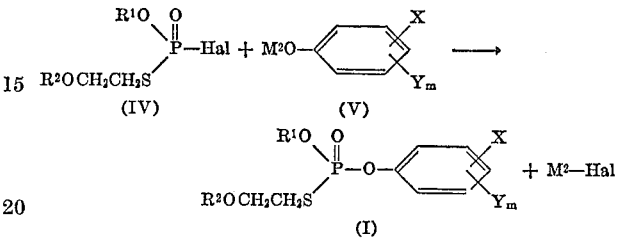

As O-alkyl-S-(2-alkoxy)ethyl halogenophosphorothiolates of General Formula IV the following are cited:

O-methyl-S-(2-ethoxy)ethyl chlorophosphorothiolate,
O-ethyl-S-(2-methoxy)ethyl chlorophosphorothiolate,
O-ethyl-S-(2-ethoxy)ethyl chlorophosphorothiolate,
O-ethyl-S-(2-n-propoxy or 2-iso-propoxy)ethyl chlorophosphorothiolate,
O-ethyl-S-2-n-(iso-, sec.- or tert.-)butoxy ethyl chlorophosphorothiolate, and the like.

As phenols of General Formula V there may be cited:

2-methoxy phenol,
4-methoxy phenol,
4-methylmercapto phenol,
4-methylmercapto-2-cresol,
4-methylmercapto-3-cresol,
4-methylmercapto-3,5-xylenol,
4-ethylmercapto phenol,
2-chloro-4-methylmercapto phenol,
4-methylsulphinyl phenol,
4-methylsulphinyl-2-cresol,
2-nitro phenol,
4-nitro phenol,
4-nitro-3-cresol,
4-nitro-2-cresol,
2-chloro-4-nitro phenol,
2-nitro-4-cresol,
4-methoxycarbonyl phenol,
2-phenyl phenol,
4-phenyl phenol,
2-ethoxycarbonyl phenol and
4-ethoxycarbonyl phenol and the like.

Process variant (b) may be carried out preferably in the presence of a solvent or diluent as described above with respect to variant (a).

This method may be carried out in the presence of an acid binder according to need. As the acid binder there may be used carbonates, bicarbonates and alcoholates of alkali metals such as $K_2CO_3$, $NaHCO_3$, and methylates and ethylates of potassium and sodium, and aliphatic, aromatic and heterocyclic tertiary amines such as triethylamine, dimethylaniline and pyridine.

When the reaction is carried out in the absence of an acid binder, the intended product can be obtained by forming in advance a salt, preferably a salt of an alkali metal such as sodium and potassium or an ammonium salt, of the phenol and then reacting the salt with a phosphoric acid diester monohalide.

In the process variant (b), the reaction may be effected at temperatures over a broad range, but generally the reaction is carried out at temperatures ranging from about −20° C. to the boiling point of the reaction mixture, preferable temperatures being in the range of about 0 to 100° C.

In the foregoing formulas $R^1$ is methyl or ethyl, preferably ethyl. $R^2$ is a lower alkyl group, examples of which are methyl, ethyl, n-propyl, iso-propyl, n-butyl, iso-butyl, sec.-butyl and tert.-butyl; methyl, ethyl, n-propyl, isopropyl and n-butyl groups are particularly preferred as $R^2$. X is lower alkoxy, lower alkyl mercapto, lower alkyl sulphinyl, lower alkoxy carbonyl, which alkyl are the same as the group recited with respect to $R^2$; methoxy, methylmercapto, ethylmercapto, methylsulphinyl and ethoxycarbonyl, nitro and phenyl are particularly preferred as X. Y is a halogen atom, for instance, chlorine, bromine, fluorine or iodine, especially chlorine and alkyl group recited with respect to $R^2$; methyl is particularly preferred.

The active compounds according to the present invention can be utilized, if desired, in the form of the usual preparations, compositions or formulations with conventional inert (i.e. plant compatible or pesticidally inert) pesticide diluents or carriers.

These may be prepared in known manner, for example by mixing the active compounds with extenders, that is, liquid or solid or gaseous diluents and/or carriers, optionally with the use of conventional pesticide adjuvants, that is, emulsifying agents and/or dispersing agents and/or adhesive agents. In the case of the use of water as an extender, organic solvents and emulsifying agent can, for example, also be used as auxiliary solvents.

As liquid diluents or carriers, there are preferably used aromatic hydrocarbons, such as xylenes, toluene, benzene dimethyl naphthalene or aromatic naphthas halogenated (chloroinated) aromatic or aliphatic hydrocarbons, such as chlorobenzenes, chloromethylene, chloroethylene or carbon tetrachloride, aliphatic hydrocarbons, such as cyclohexane or paraffins (for example petroleum fractions), alcohols, such as methanol or butanol, ketones such as acetones, methyl ethyl ketone or cyclohexanone, amines such as ethanol amine, ethers such as glycol monomethyl ether, strongly polar solvents, such as dimethyl formamide, dimethyl sulfoxide or acetonitrile, as well as water.

As solid diluents or carriers, there are preferably used ground natural minerals, such as clays, talc, chalk, i.e. calcium carbonate, attapulgite, montmorillonite, diatomaceous earth or pumice or ground synthetic minerals, such as highly dispersed silicic acid, alumina or silicates.

As gaseous diluents or carriers there may be used aerosol propellants which are gaseous at normal temperatures and pressures, such as freon.

Preferred examples of adjuvants (diluents or carriers' assistants) include non-ionic, cationic and anionic emulsifiers, such as polyoxyethylene-fatty acid esters, polyoxyethylene-fatty alcohol ethers, for example alkylarylpolyglycol ethers, alkyl sulfonates and aryl sulfonates; and preferred examples of dispersing or adhesive agents include lignin, sulfite waste liquors and methyl cellulose.

The compounds of the present invention can be used, if desired, together with other agricultural chemicals, for example insecticides, nematocides, fungicides (including antibiotics), herbicides, plant growth-regulators or fertilizers.

The herbicidal composition or formulation according to the present invention generally contains 0.1 to 95 percent by weight, preferably 0.5 to 90% by weight, of the active compound. However, the content of active ingredients may be varied in accordance with the formulation and the applying method, the purpose, the period of application, the place of application and other circumstances.

The compounds may be formulated in any of the usual ways in the field of agricultural chemicals, for example solutions, emulsions, emulsion concentrates, wettable powders, aqueous solutions, oil formulations, aerosols, pastes, fumigants, dusting powders, coating granules, tablets, granules, pellets and the like.

The compounds may be applied to the pests or its habitat in any of the usual ways, for example, by scattering, spraying, atomizing, misting, dusting, mixing, fumigating, injecting or powder-coating methods.

Furthermore, the application can be effected by the so-called "ultra-low-volume" method. In this method it may be possible to use 95% to 100% of the active compound.

In use, the content of the active ingredient in the ready-to-use preparation can be varied over a broad range according to circumstances above. However, it may generally be preferable to use a range from 0.0001 to 20% by weight, especially 0.001 to 5.0% by weight.

Also, the amount of active compound applied per unit area is usually about 15 to 1000 grams, preferably 40 to 600 grams of active compound per 10 ares. However, in special cases, it may be possible to use more or less sometimes such variations may be required.

The invention therefore provides a pesticidal composition containing as active ingredient a compound according to the invention in admixture with a solid diluent or carrier or in admixture with a liquid diluent or carrier, if desired, containing adjuvant.

The invention provides a method of combating harmful pests which comprises applying to these pests or a habitat thereof a compound according to the invention alone or in the form of a composition containing as active ingredient a compound according to the invention in admixture with a solid or liquid diluent or carrier or adjuvant.

The invention also provides plants protected from damage by seeds by being grown in areas in which, immediately prior to and/or during the time of the growing, a compound according to the invention was applied alone or in admixture with a solid or liquid diluent or carrier. It will be seen that the usual methods of providing harvested agricultural products may be improved by the present invention.

The unexpected superiority and outstanding activity of the particular new compounds of the present invention is illustrated without limitation by the following examples.

EXAMPLE 1

28 g. of potassium hydroxide are dissolved in 150 ml. of water and 250 ml. of dioxane are added to the solution. At 30–40° C., 74 g. of O-ethyl-O-(3-methyl-4-methylmercapto phenyl)thionophosphoryl chloride are added dropwise, and the mixed solution is agitated for 2 hours at 70° C. Dioxane and water are distilled off under reduced pressure, and the residue is dissolved in water. Benzene is added to the solution, followed by shaking. The water layer is concentrated, and the residue is dissolved in acetone, followed by separation of inorganic salts by filtration. Distillation of acetone gives 58 g. of crude crystals of potassium O-ethyl-O-(3-methyl-4-methylmercapto)phenylthiophosphate of the following formula:

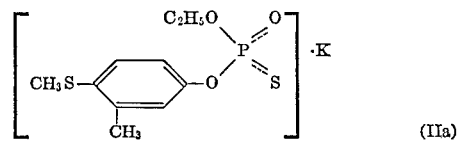

(IIa)

EXAMPLE 2

31.6 g. of potassium O-ethyl-O-(3-methyl-4-methylmercapto)phenylthiophosphate are dissolved in 100 ml. of alcohol. 16 g. of 2-ethoxyethyl bromide are added dropwise to the solution and agitation is effected at 70° C. for 4 hours. The inorganic salts formed are separated by filtration and the alcohol is distilled off. The residue is dissolved in benzene and washed with water and 1% sodium carbonate, followed by dehydration and distillation of benzene. Vacuum distillation of the residue gives 25 g. of O-ethyl-O-(3-methyl-4-methylmercapto)phenyl-S-(2-ethoxy)ethylphosphorothiolate of the following formula

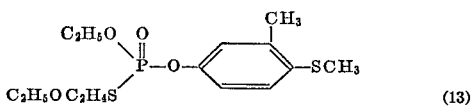
(13)

which is characterized by a boiling point of 176–183° C./0.2 mm. Hg and $n_D^{20}$ value of 1.5489.

EXAMPLE 3

14 g. of 4-methylmercapto phenol are dissolved in 150 ml. of benzene, and 10.1 g. of triethylamine are added to the solution. To the solution maintained at a temperature below 10° C. 23.3 g. of O-ethyl-S-(2-ethoxy)ethyl chlorophosphorothiolate are added dropwise with stirring. After termination of the addition, the agitation is continued for a while at room temperature, and then the reaction mixture is heated for 3 hours at 60–65° C. with agitation. After the termination of the reaction, the resulting mixture is washed with water, 1% hydrochloric acid and 1% sodium carbonate. The water is removed from the mixture by anhydrous sodium sulfate, and the benzene is distilled off. Vacuum distillation of the residue gives 24 g. of O-ethyl-O-(4-methylmercapto)phenyl-S-(2-ethoxy)ethylphosphorothiolate of the following formula

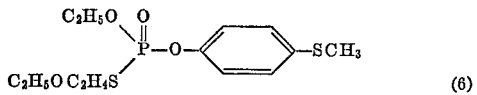
(6)

which is characterized by a boiling point of 165–168° C. under 0.1 mm. Hg and $n_D^{20}$ value of 1.5470.

EXAMPLE 4

The compounds identified in following Table 1 include those made in Examples 2 and 3 as well as others made by analogous processes. The table identifies the compounds by indicating in each case the meaning of the variables in Formula I above.

TABLE 1

| Compound | $R^1$ | $R^2$ | X | m | Y | Boiling point | Refractive index $n_D^{20}$ |
|---|---|---|---|---|---|---|---|
| 1 | $C_2H_5$ | $C_2H_5$ | 4-$CH_3O$— | 0 | | 162–167° C./0.1 mm. Hg | 1.5173 |
| 2 | $C_2H_5$ | iso-$C_3H_7$ | 4-$CH_3O$— | 0 | | 165–171° C./0.15 mm. Hg | 1.5123 |
| 3 | $C_2H_5$ | $C_2H_5$ | 2-$CH_3O$— | 0 | | 160–167° C./0.1 mm. Hg | 1.5183 |
| 4 | $C_2H_5$ | iso-$C_3H_7$ | 2-$CH_3O$— | 0 | | 162–165° C./0.1 mm. Hg | 1.5150 |
| 5 | $C_2H_5$ | $CH_3$ | 4-$CH_3S$— | 0 | | 163–169° C./0.15 mm. Hg | 1.5531 |
| 6 | $C_2H_5$ | $C_2H_5$ | 4-$CH_3S$— | 0 | | 165–168° C./0.1 mm. Hg | 1.5470 |
| 7 | $C_2H_5$ | n-$C_3H_7$ | 4-$CH_3S$— | 0 | | 160–168° C./0.07 mm. Hg | 1.5393 |
| 8 | $C_2H_5$ | iso-$C_3H_7$ | 4-$CH_3S$— | 0 | | 160–165° C./0.07 mm. Hg | 1.5391 |
| 9 | $C_2H_5$ | n-$C_4H_9$ | 4-$CH_3S$— | 0 | | 162–169° C./0.06 mm. Hg | 1.5357 |
| 10 | $C_2H_5$ | $C_2H_5$ | 4-$CH_3S$— | 1 | 2-$CH_3$ | 174–180° C./0.15 mm. Hg | 1.5450 |
| 11 | $C_2H_5$ | iso-$C_3H_7$ | 4-$CH_3S$— | 1 | 2-$CH_3$ | 178–182° C./0.25 mm. Hg | 1.5391 |
| 12 | $CH_3$ | $C_2H_5$ | 4-$CH_3S$— | 1 | 3-$CH_3$ | | 1.5630 |
| 13 | $C_2H_5$ | $C_2H_5$ | 4-$CH_3S$— | 1 | 3-$CH_3$ | 176–183° C./0.2 mm. Hg | 1.5489 |
| 14 | $C_2H_5$ | n-$C_3H_7$ | 4-$CH_3S$— | 1 | 3-$CH_3$ | 163–167° C./0.05 mm. Hg | 1.5429 |
| 15 | $C_2H_5$ | iso-$C_3H_7$ | 4-$CH_3S$— | 1 | 3-$CH_3$ | 160–165° C./0.07 mm. Hg | 1.5410 |
| 16 | $C_2H_5$ | $C_2H_5$ | 4-$CH_3S$— | 2 | 3,5-$(CH_3)_2$ | 165–169° C./0.15 mm. Hg | 1.5411 |
| 17 | $C_2H_5$ | iso-$C_3H_7$ | 4-$CH_3S$— | 2 | 3,5-$(CH_3)_2$ | | |
| 18 | $C_2H_5$ | $C_2H_5$ | 4-$C_2H_5S$— | 0 | | | |
| 19 | $C_2H_5$ | iso-$C_3H_7$ | 4-$C_2H_5S$— | 0 | | | |
| 20 | $C_2H_5$ | $C_2H_5$ | 4-$CH_3S$— | 1 | 2-Cl | | |
| 21 | $C_2H_5$ | n-$C_3H_7$ | 4-$CH_3S$— | 1 | 2-Cl | | |
| 22 | $C_2H_5$ | $C_2H_5$ | 4-$CH_3S(O)$— | 0 | | | 1.5432 |
| 23 | $C_2H_5$ | $C_2H_5$ | 4-$CH_3S(O)$— | 1 | 3-$CH_3$ | | 1.5439 |
| 24 | $C_2H_5$ | $C_2H_5$ | 4-$CH_3S(O)$— | 1 | 2-$CH_3$ | | 1.5431 |
| 25 | $C_2H_5$ | $CH_3$ | 4-$NO_2$ | 0 | | | |
| 26 | $C_2H_5$ | $C_2H_5$ | 4-$NO_2$ | 0 | | 165–170° C./0.1 mm. Hg | 1.5378 |
| 27 | $C_2H_5$ | iso-$C_3H_7$ | 4-$NO_2$ | 0 | | 176–181° C./0.08 mm. Hg | 1.5312 |
| 28 | $C_2H_5$ | $C_2H_5$ | 4-$NO_2$ | 1 | 3-$CH_3$ | | |
| 29 | $C_2H_5$ | iso-$C_3H_7$ | 4-$NO_2$ | 1 | 3-$CH_3$ | | |
| 30 | $C_2H_5$ | $C_2H_5$ | 4-$NO_2$ | 1 | 2-Cl | | |
| 31 | $C_2H_5$ | iso-$C_3H_7$ | 4-$NO_2$ | 1 | 2-Cl | | |
| 32 | $C_2H_5$ | $C_2H_5$ | 2-$NO_2$ | 0 | | | |
| 33 | $C_2H_5$ | iso-$C_3H_7$ | 2-$NO_2$ | 0 | | | |
| 34 | $C_2H_5$ | $C_2H_5$ | 2-$NO_2$ | 1 | 4-$CH_3$ | 175–180° C./0.15 mm. Hg | 1.5271 |
| 35 | $C_2H_5$ | n-$C_3H_7$ | 2-$NO_2$ | 1 | 4-$CH_3$ | 163–167° C./0.1 mm. Hg | 1.5260 |
| 36 | $C_2H_5$ | iso-$C_3H_7$ | 2-$NO_2$ | 1 | 4-$CH_3$ | 161–166° C./0.1 mm. Hg | 1.5259 |
| 37 | $C_2H_5$ | $C_2H_5$ | 4-$C_2H_5OC(O)$— | 0 | | 154–157° C./0.1 mm. Hg | 1.5132 |
| 38 | $C_2H_5$ | iso-$C_3H_7$ | 4-$C_2H_5OC(O)$— | 0 | | | |
| 39 | $C_2H_5$ | $C_2H_5$ | 2-$C_2H_5OC(O)$— | 0 | | 155–158° C./0.2 mm. Hg | 1.5110 |
| 40 | $C_2H_5$ | iso-$C_3H_7$ | 2-$C_2H_5OC(O)$— | 0 | | | |
| 41 | $C_2H_5$ | $CH_3$ | 4-⌬ | 0 | | 188–193° C./0.1 mm. Hg | 1.5733 |
| 42 | $C_2H_5$ | $C_2H_5$ | Same as above | 0 | | 190–194° C./0.1 mm. Hg | 1.5672 |
| 43 | $C_2H_5$ | n-$C_3H_7$ | do | 0 | | 190–198° C./0.12 mm. Hg | 1.5620 |
| 44 | $C_2H_5$ | iso-$C_3H_7$ | do | 0 | | 193–197° C./0.15 mm. Hg | 1.5610 |
| 45 | $C_2H_5$ | n-$C_4H_9$ | do | 0 | | 186–191° C./0.08 mm. Hg | 1.5581 |
| 46 | $C_2H_5$ | $C_2H_5$ | 2-⌬ | 0 | | 177–181° C./0.15 mm. Hg | 1.5594 |
| 47 | $C_2H_5$ | iso-$C_3H_7$ | Same as above | 0 | | 175–179° C./0.15 mm. Hg | 1.5520 |

EXAMPLE 5

15 parts[1] of Compound 13, 80 parts[1] of diatomaceous earth and clay and 5 parts of the emulsifier "Runnox" (product of Toho Kagaku Kogyo K.K., Japan) are ground and mixed together to form a wettable powder. It is diluted with water for actual application. [Diatomaceous earth and clay (3:2); "Runnox": polyoxyethylenealkylarylether.]

EXAMPLE 6

30 parts[1] of Compound 23, 30 parts[1] of xylene, 30 parts[1] of "Kawakazol" (product of Kawasaki Kasei Kogyo K.K., Japan) and 10 parts of the emulsifier "Sorpol" (product of Toho Kagaku Kogyo K.K., Japan) are mixed with stirring to form an emulsifiable preparation. It is diluted with water for actual application. ["Kawakazol": aliphatic hydrocarbons with a high boiling point; "Sorpol": polyoxyethylenealkylarylether.]

EXAMPLE 7

10 parts[1] of Compound 26, 10 parts[1] of bentonite, 78 parts[1] of clay and 2 parts of lignin sulfonate are formed into a mixture and it is intimately mixed with 25 parts of water. The mixture is finely divided by means of an extruding granulator to give particles of 20–40 mesh, followed by drying at 40–50° C.

EXAMPLE 8

2 parts[1] of Compound 44 and 98 parts of a mixture of talc and clay are ground and mixed together to form a powdery ready-to-use preparation. [Talc and clay (3:1).]

Unexpected advantages and prominent effects of the novel compounds of this invention can be seen from the test results which will be given below.

EXAMPLE 9

Test 1: Test on rice stem borers (*Chilo supperssalis*) larvae

Solvent: 5 parts by weight of acetone
Emulsifier: 1 part by weight polyoxyethylene alkylarylether To prepare a suitable preparation of the active compound, 1 part by weight of the active compound was thoroughly mixed with the stated amount of solvent and the stated amount of emulsifier. The obtained emulsifiable concentrate was then diluted with water to the desired concentration.

Test procedure: Egg masses of rice stem borer were attached to paddy rice plants of tillering stage, 3 to 5 of which being in one pot of about 12 cm. diameter. 7 days after the hatching of the eggs, such plants were sprayed with the preparation of the active compound until dripping wet. 3 pots were used for each active compound at each concentration. The pots were placed in a greenhouse and the temperature was maintained at 25° C. Three days after the spraying, the stems of the plants were split by hand and the numbers of surviving dead insects in the stems were counted and the mortality rate was calculated as a percentage. 100% means that all the insects were killed, 0% means that none of the insects were killed.

The average results obtained are shown in the Table 2.

[1] The term "parts" used in the Examples 5 to 8 means weight.

TABLE 2.—RESULTS OF TESTS ON RICE STEM BORERS

| Active ingredient concentration, p.p.m... | Killing ratio | |
|---|---|---|
| | 250 | 100 |
| Compound: | | |
| 1 | 100 | |
| 3 | 100 | |
| 5 | 100 | 81.7 |
| 6 | 100 | 92.9 |
| 7 | 95.9 | |
| 8 | 100 | |
| 9 | 100 | |
| 13 | 100 | 100 |
| 14 | 100 | |
| 15 | 100 | |
| 22 | 100 | |
| 23 | 100 | 100 |
| 27 | 100 | |
| 34 | 94.1 | |
| 37 | 89.7 | |
| 42 | 86.4 | |
| 43 | 90.4 | |
| 44 | 100 | |
| 46 | 100 | |
| B Dipterex (commercially available comparison) | 95 | 0 |
| Untreated (control) | 0 | |

NOTE.—The compound numbers in the table correspond to those in Table 1. B=O,O,-dimethyl-2,2,2-trichloro-1-hydroxyethyl-phosphonate.

EXAMPLE 10

Test on tobacco cutworm (*Prodenia litura*) larvae

Test procedure: Leaves of sweet potato were dipped in the diluted preparation of the active compound prepared in the same manner described in Test 1 and then dried and put in a Petri dish of 9 cm. diameter. 10 tobacco cutworm larvae were then placed in the dish. The dish was kept at a temperature of 28° C. 30 test insects were used altogether for each active compound at each concentration.

After 24 hours, the number of dead insects were counted and the mortality rate was calculated as a percentage. 100% means that all insects were killed, 0% means that none of the insects were killed.

The average results obtained are shown in the table below.

TABLE 3.—RESULTS OF TEST ON TOBACCO CUTWORM LARVAE

| Active ingredient concentration, p.p.m. | Killing ratio (percent) | | |
|---|---|---|---|
| | 1,000 | 300 | 100 |
| Compound: | | | |
| 1 | 100 | 40 | |
| 2 | 100 | 40 | |
| 3 | 100 | 100 | 50 |
| 4 | 100 | 80 | |
| 5 | 100 | 100 | 50 |
| 6 | 100 | 100 | 100 |
| 7 | 100 | 100 | 100 |
| 8 | 100 | 100 | 100 |
| 9 | 100 | 100 | 70 |
| 10 | 100 | 100 | 80 |
| 11 | 100 | 100 | 80 |
| 12 | 100 | 90 | 40 |
| 13 | 100 | 100 | 90 |
| 14 | 100 | 100 | 100 |
| 15 | 100 | 100 | 90 |
| 16 | 100 | 100 | 90 |
| 17 | 100 | 100 | 80 |
| 18 | 100 | 100 | 80 |
| 19 | 100 | 100 | 80 |
| 20 | 100 | 100 | 70 |
| 21 | 100 | 100 | 70 |
| 22 | 100 | 100 | 60 |
| 23 | 100 | 100 | 70 |
| 24 | 100 | 100 | |
| 25 | 100 | 100 | 40 |
| 26 | 100 | 100 | |
| 28 | 100 | 100 | 80 |
| 29 | 100 | 100 | 90 |
| 30 | 100 | 100 | 60 |
| 31 | 100 | 100 | 80 |
| 32 | 100 | 100 | 70 |
| 33 | 100 | 100 | 60 |
| 34 | 100 | 80 | |
| 35 | 100 | 100 | |
| 36 | 100 | 60 | |
| 37 | 100 | 100 | |
| 38 | 100 | 70 | |
| 39 | 100 | 80 | |
| 40 | 100 | 60 | |
| 41 | 100 | 100 | 60 |
| 42 | 100 | 100 | 70 |

See footnote at end of table.

TABLE 3—Continued

| Active ingredient concentration, p.p.m. | Killing ratio (percent) | | |
|---|---|---|---|
| | 1,000 | 300 | 100 |
| 43 | 100 | 100 | 60 |
| 44 | 100 | 100 | 100 |
| 45 | 100 | 100 | |
| 46 | 100 | 100 | 100 |
| 47 | 100 | 100 | 0 |
| A (Netherlands Pat. 6816844) | 100 | 60 | |
| B Dipterex (commercially available comparison) | 100 | 25 | 0 |
| C Sumithion (commercially available comparison) | 100 | 80 | 20 |
| Untreated (control) | 0 | | |

NOTE.—The compound numbers in the table correspond to those in Table 1; A=O-ethyl-S-(2-ethylthio)ethyl-O-(4-chlorophenyl)-phosphorothiolate; C=O,O-dimethyl-O-(3-methyl-4-nitrophenyl)-thiophosphate.

EXAMPLE 11

Test on the adult house fly (*Musca domestica*)

Test procedure: 1 ml. of the diluted preparation of the active compound (prepared in the same manner described in Example 9) adsorbed onto filter paper placed in a Petri dish of 9 cm. diameter. 10 mature female adult house flies were then placed in the Petri dish. The dish was kept at a temperature of 28° C. 30 test insects were used altogether for each active compound at each concentration.

After 24 hours, the number of dead insects was counted and the mortality rate was calculated as a percentage. 100% means that all insects were killed, 0% means that none of the insects were killed.

The average results obtained are shown in the Table 4.

TABLE 4.—RESULTS OF TESTS ON ADULT HOUSE FLY

| Active ingredient concentration, p.p.m. | Killing ratio (percent) | |
|---|---|---|
| | 1,000 | 100 |
| Compound: | | |
| 5 | 100 | 90 |
| 6 | 100 | 80 |
| 7 | 100 | 100 |
| 8 | 100 | 100 |
| 9 | 100 | 100 |
| 10 | 100 | 100 |
| 11 | 100 | 100 |
| 12 | 100 | 80 |
| 13 | 100 | 100 |
| 14 | 100 | 100 |
| 15 | 100 | 100 |
| 16 | 100 | 100 |
| 17 | 100 | 100 |
| 18 | 100 | 100 |
| 19 | 100 | 100 |
| 20 | 100 | 100 |
| 21 | 100 | 100 |
| 22 | 100 | 90 |
| 23 | 100 | 100 |
| 24 | 100 | 80 |
| 25 | 100 | 90 |
| 26 | 100 | 100 |
| 27 | 100 | 100 |
| 28 | 100 | 100 |
| 29 | 100 | 100 |
| 30 | 100 | 90 |
| 31 | 100 | 100 |
| 32 | 100 | 90 |
| 34 | 100 | 100 |
| 37 | 100 | 80 |
| 44 | 100 | 80 |
| A (Netherlands Pat. No. 6816844) (comparison) | 100 | 80 |
| D BHC (hexachlorobenzene) (comparison) | 100 | 80 |
| Untreated (control) | 0 | |

NOTE.—The compound numbers in the table correspond to those in Table 1.

EXAMPLE 12

Test on mosquito larvae (*Culex molestus*)

Test procedure: 100 ml. of the diluted preparation of the active compound, prepared in the same manner described in Example 9, were adsorbed onto filter paper placed in a Petri dish of 9 cm. diameter. 25 mosquito larvae were then placed in the Petri dish. The dish was kept at a temperature of 28° C. 75 test insects were used altogether for each active compound at each concentration.

After 24 hours, the number of dead insects was counted and the mortality rate was calculated as a percentage. 100% means that all insects were killed, 0% means that none of the insects were killed.

The average results obtained are shown in the Table 5.

TABLE 5.—RESULTS OF TESTS ON MOSQUITO LARVAE

| Active ingredient concentration, percent | Killing ratio (percent) | |
|---|---|---|
| | 1 | 0.1 |
| Compound: | | |
| 5 | 100 | 100 |
| 6 | 100 | 100 |
| 8 | 100 | 100 |
| 9 | 100 | 100 |
| 11 | 100 | 100 |
| 12 | 100 | 100 |
| 13 | 100 | 100 |
| 14 | 100 | 100 |
| 15 | 100 | 100 |
| 26 | 100 | 100 |
| 36 | 100 | 100 |
| 38 | 100 | 100 |
| 47 | 100 | 100 |
| A (Netherlands Pat. No. 6816844) (comparison) | 100 | 80 |
| B Sumithion (comparison) | 100 | 100 |
| Untreated (control) | 0 | |

EXAMPLE 13

Test on rice blast (*Piricularia oryzae*)/(pot test)

Test of preventive effect: Rice plant (Jukkoku variety) is cultivated in a pot of 12 cm. diameter and the preparation of the active compound prepared in the same manner as in Example 9 is sprayed on the rice plant in an amount of 50 ml. per 3 pots.

The sprayed rice plant is kept in a chamber maintained at 25° C. and a relative humidity of 100% for 2 days from the next day after the chemical spraying. While kept in the chamber the rice plant is inoculated twice with a suspension of spores of artificially cultured pathogenic fungi of blast by spraying.

Seven days after inoculation, the degree of infestation was determined by applying a scale ranging from 0 to 5, and the control value of each particular active compound against *Piricularia oryzae* was determined in accordance with the formula below:

| Degree of infestation: | Infested area of leaf in percent of total leaf |
|---|---|
| 0 | 0%. |
| 0.5 | 0–2%. |
| 1 | 2–5%. |
| 2 | 5–10%. |
| 3 | 10–20%. |
| 4 | 20–40%. |
| 5 | 40 or more percent. |

Control value $$= \frac{\left(\begin{array}{c}\text{Degree of infestation}\\ \text{of control plant}\end{array}\right) - \left(\begin{array}{c}\text{Degree of infestation}\\ \text{of treated test plant}\end{array}\right)}{\text{Degree of infestation of treated test plant}} \times 100$$

At the same time, the phytotoxicity against rice plants was determined.

The particular active compounds tested, their concentrations and the average results obtained can be seen from the following Table 6.

EXAMPLE 14

Test on sheath blight (*Pellicularia sasakii*)/(pot test)

Test procedure: Rice plant (Kinmaze variety) is cultivated in a 12 cm. diameter pot, and at the tillering stage the preparation of active compound prepared in the same manner as in Example 9, is applied to the rice plant in an amount of 50 ml. per 3 pots.

The next day, the root of the treated rice plant is inoculated with pathogenic fungi of sheath blight which has been cultured in a barley culture medium for 10 days and in which sclerotia has been formed. Then the plant is kept in an inoculation chamber maintained at 28–30° C. and a relative humidity of more than 95% for 8 days.

The infestation of the stems was determined and characterized by the values $n_0$ to $n_3$ having the meaning given below.

The degree of infestation was determined by means of the Formula 1 and the control value of each compound was calculated in accordance with the Formula 2:

$$\text{Degree of infestation} = \frac{3 \cdot n_3 + 2 \cdot n_2 + 1 \cdot n_1 + 0 \cdot n_0}{3 \cdot N} \times 100 \quad (1)$$

wherein

N = the number of the total stems examined
$n_0$ = the number of non-infested stems
$n_1$ = the number of stems infested up to the first leaf (from the bottom)
$n_2$ = the number of stems infested up to the second leaf (from the bottom)
$n_3$ = the number of stems infested up to and above the third leaf (from the bottom)

Control value =

$$\frac{\left(\begin{array}{c}\text{Degree of infestation of}\\\text{non-treated control plants}\end{array}\right) - \left(\begin{array}{c}\text{Degree of infestation}\\\text{of treated test plants}\end{array}\right)}{\text{Degree of infestation of treated test plants}}$$

The active compounds tested, their concentrations and the average results can be seen from the following table.

The phytotoxicity of the chemical was also examined. The results are given in the following Table 6 wherein the symbol "—" means that the chemical did not adversely affect the growth of the rice plant.

TABLE 6.—TESTS ON EFFECTS AGAINST BLAST AND SHEATH BLIGHT

| Compound number | Active ingredient concentration (p.p.m.) | Protective value Blast | Protective value Sheath blight | Phytotoxicity |
|---|---|---|---|---|
| 1 | 500 | | 84 | — |
| 2 | 500 | 74 | 77 | — |
| 34 | 500 | 70 | 62 | — |
| 36 | 500 | 95 | 54 | — |
| 38 | 500 | 75 | 60 | — |
| 42 | 500 | 70 | 77 | — |
| 47 | 500 | 78 | 72 | — |
| Kitazin (commercially available comparison) | 500 | 65 | 31 | — |
| Untreated (control) | | 0 | 0 | — |

NOTE.—Kitazin = O,O-diethyl-S-benzylthiophosphate.

It will be appreciated that the instant specification and examples are set forth by way of illustration and not limitation, and that various modifications and changes may be made without departing from the spirit and scope of the present invention.

What is claimed is:

1. Organic phosphoric acid esters of the general formula:

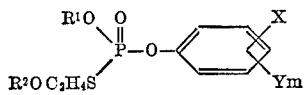

wherein
$R^1$ is a methyl or ethyl group,
$R^2$ is a lower alkyl group,
X is a lower alkoxy, lower alkylmercapto, lower alkylsulphinyl, lower alkoxycarbonyl, nitro or phenyl group in the 2- or 4-position,
Y is a halogen atom or a lower alkyl group, and m is 0, 1 or 2.

2. Compounds according to claim 1 in which $R^2$ is a methyl, ethyl, n-propyl, iso-propyl or n-butyl, X is a methoxy, methylmercapto, ethylmercapto, methylsulphinyl, ethoxycarbonyl, nitro or phenyl group, and Y is a chlorine or methyl group.

3. Compounds according to claim 1 wherein such compound is O-ethyl-O-(4-methoxy)phenyl-S-(2-ethoxy)ethylphosphorothiolate of the formula

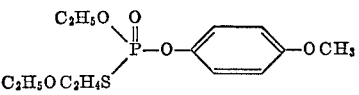

4. Compound according to claim 1 wherein such compound is O - ethyl - O-(4-methylmercapto)phenyl-S-(2-ethoxy)ethylphosphorothiolate of the formula

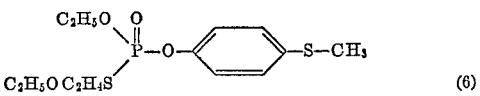

5. Compound according to claim 1 wherein such compound is O - ethyl - O-(4-methylmercapto)phenyl-S-(2-n-propoxy)ethylphosphorothiolate of the formula

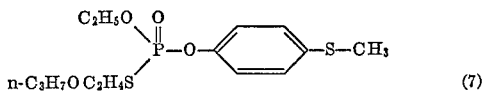

6. Compound according to claim 1 wherein such compound is O - ethyl - O-(4-methylmercapto)phenyl-S-(2-isopropoxy)ethylphosphorothiolate of the formula

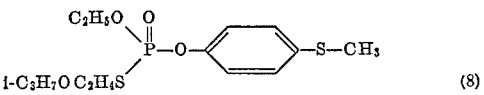

7. Compound according to claim 1 wherein such compound is O - ethyl-O-(3-methyl-4-methylmercapto)phenyl-S-(2-ethoxy)ethylphosphorothiolate of the formula

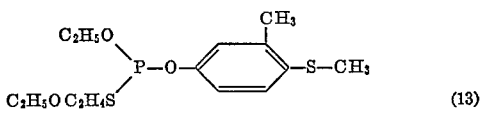

8. Compound according to claim 1 wherein such compound is O - ethyl-O-(3-methyl-4-methylmercapto)phenyl-S-(2-n-propoxy)ethylphosphorothiolate of the formula

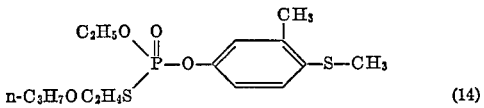

9. Compound according to claim 1 wherein such compound is O - ethyl - O-(3,5-dimethyl-4-methylmercapto)phenyl-S-(2-ethoxy)ethylphosphorothiolate of the formula

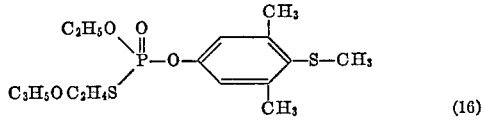

10. Compound according to claim 1 wherein such compound is O - ethyl-O-(2-chloro-4-methylmercapto)phenyl-S-(2-ethoxy)ethylphosphorothiolate of the formula

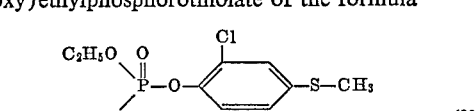

11. Compound according to claim 1 wherein such compound is O - ethyl-O-(4-nitro)phenyl-S-(2-ethoxy)ethylphosphorothiolate of the formula

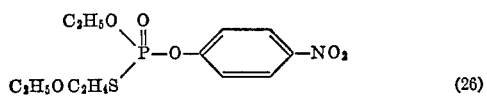

12. Compound according to claim 1 wherein such compound is O - ethyl-O-(3-methyl-4-nitro)phenyl-S-(2-isopropoxy)ethylphosphorothiolate of the formula

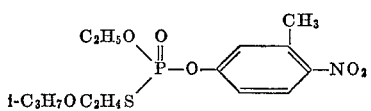 (29)

13. Compound according to claim 1 wherein such compound is O - ethyl-O-(2-chloro-4-nitro)phenyl-S-(2-isopropoxy)ethylphophorothiolate of the formula

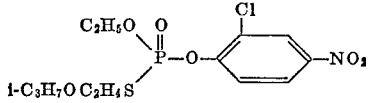 (31)

14. Compound according to claim 1 wherein such compound is O - ethyl - O-(4-phenyl-S-(2-ethoxy)ethylphosphorothiolate of the formula

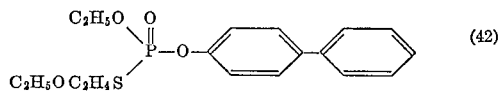 (42)

References Cited
UNITED STATES PATENTS
3,444,274   5/1969   Schrader _____ 260—949 X
3,557,258   1/1971   Beriger et al. _____ 260—951

LEWIS GOTTS, Primary Examiner

A. H. SUTTO, Assistant Examiner

U.S. Cl. X.R.

260—941, 950, 951, 964; 424—212, 216, 217